United States Patent [19]

Fujii

[11] Patent Number: 4,700,839

[45] Date of Patent: Oct. 20, 1987

[54] PACKAGE INCLUDING DISK-FORM MAGNETIC RECORDING MEDIUMS

[75] Inventor: Tatsuo Fujii, Saku, Japan

[73] Assignee: 501 TDK Corporation, Tokyo, Japan

[21] Appl. No.: 725,428

[22] Filed: Apr. 22, 1985

[30] Foreign Application Priority Data

Apr. 24, 1984 [JP] Japan .............................. 59-60828[U]
May 8, 1984 [JP] Japan .............................. 59-66722[U]

[51] Int. Cl.$^4$ ........................................... B65D 85/57
[52] U.S. Cl. .................................... 206/444; 206/303; 206/309; 206/461; 206/805
[58] Field of Search ............... 206/303, 309, 444, 445, 206/461, 462, 508, 805; 360/97–99, 133

[56] References Cited

U.S. PATENT DOCUMENTS

| | | | |
|---|---|---|---|
| 1,525,745 | 2/1925 | Keefer | 206/805 |
| 2,627,991 | 2/1953 | Maersch | 206/508 |
| 2,986,300 | 5/1961 | Parrish | 206/508 |
| 3,229,811 | 1/1966 | Studwell | 206/303 |
| 4,226,237 | 10/1980 | Ballard | 206/497 |
| 4,261,462 | 4/1981 | Wysocki | 206/462 |
| 4,316,281 | 2/1982 | Prusak | 206/309 |
| 4,436,203 | 3/1984 | Reyner | 206/524.8 |
| 4,457,429 | 7/1984 | Huber et al. | 206/444 |
| 4,502,598 | 3/1985 | Wartenbergh | 206/444 |
| 4,512,474 | 4/1985 | Harding | 206/461 |
| 4,516,678 | 5/1985 | Fotiadis et al. | 206/444 |

OTHER PUBLICATIONS

D. E. Griffiths et al., "Record Disk Assemblies", I.B.M. Technical Disclosure Bulletin, vol. 16, No. 12, May 1974.

Primary Examiner—William Price
Assistant Examiner—Jimmy G. Foster
Attorney, Agent, or Firm—Price, Gess & Ubell

[57] ABSTRACT

A package comprising a case which comprises a bottom member and a cover member, and a plurality of disk-form magnetic recording mediums, each having a central hole, which are contained in the case in a stacked state one on another while an upright pillar standing on the center of the bottom member is relatively inserted into the central holes of the disk-form magnetic recording mediums. The package may be tied from the outside by binding means or may be wrapped by a plastic film by means of a vacuum packing. The disk-form magnetic recording mediums packed in the case are protected from the dust and the moisture perfectly, and the damage of the recording mediums caused by the rubbing therebetween by vibrations or the like during the transit can be prevented by the upright pillar inserted into the holes of the recording mediums.

11 Claims, 4 Drawing Figures

PACKAGE INCLUDING DISK-FORM MAGNETIC RECORDING MEDIUMS

BACKGROUND OF THE INVENTION

The present invention relates to a package including a plurality of disk-form magnetic recording mediums used for a floppy disk and so forth.

Lately, a floppy disk draws the attention as a storage element in various data processing apparatus and comprises a disk-form magnetic recording medium comprising a flexible polyester film base and a magnetic paint applied thereto. The floppy disk is stored in a protective jacket. Hence, for a finished floppy disk the disk-form magnetic recording medium is sufficiently protected. However, before finishing the floppy disk such a disk-form magnetic recording medium is not protected by proper means and accordingly the dust attaches to its surface as well as the moisture. Further, when a plurality of disk-form magnetic recording mediums are stacked one on another in contact with one another, scratches are made by rubbing caused by vibrations or the like during transit, which causes troubles such as a dropout.

SUMMARY OF THE INVENTION

It is an object of the present invention to provide a package including a plurality of disk-form magnetic recording mediums stacked one on another in contact with one another therein, free from the abovementioned defects and disadvantages, which is portable and is capable of protecting exactly from scratches made by rubbing caused by vibrations or the like during transit, as well as dust and moisture attached to their surfaces.

In accordance with one aspect of the invention, there is provided a package including a plurality of disk-form magnetic recording mediums, comprising a case comprising a bottom member and a cover member, and a plurality of disk-form magnetic recording mediums, each having a central hole, which are contained in the case in a stacked state one on another, wherein the bottom member is provided with an upright pillar on its center, and the upright pillar is relatively inserted into the central holes of the disk-form magnetic recording mediums when they are stacked one on another.

In accordance with a more specific aspect of the present invention, spacers are placed between the bottom member and the lowermost magnetic recording medium and between the uppermost magnetic recording medium and the cover member.

Other and further objects, features and advantages of the invention will appear more fully from the following description with reference to the accompanying drawings, in which:

DESCRIPTION OF THE PREFERRED EMBODIMENTS

Figure 1:
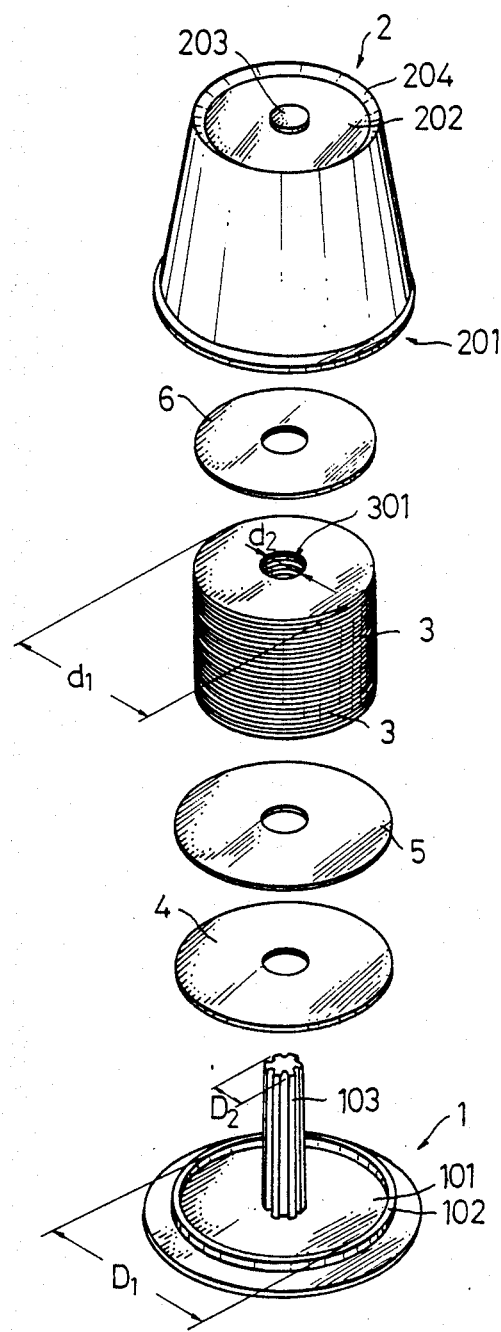
FIG. 1 is an exploded perspective view of a package including a plurality of disk-form magnetic recording mediums according to the present invention.
Figure 2:
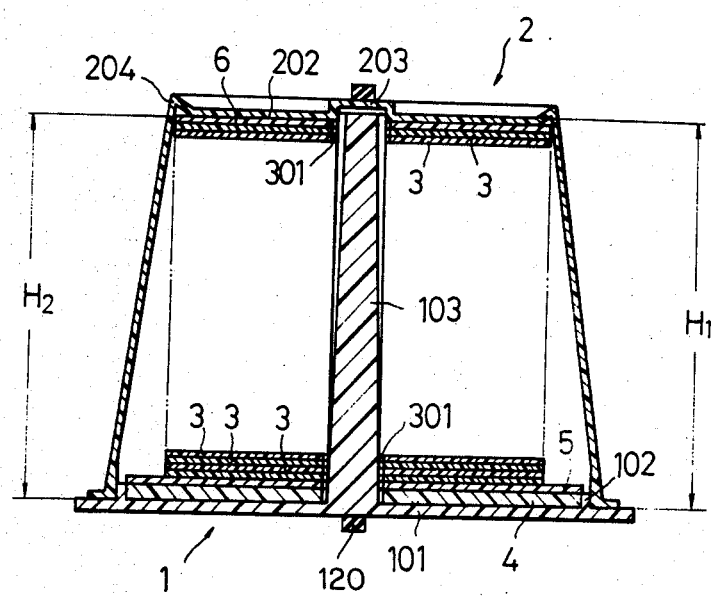
FIG. 2 is a longitudinal cross sectional view of the package shown in FIG. 1.

Referring now to the drawings, wherein similar or corresponding components are designated by like reference numerals throughout the different figures, there is shown in FIGS. 1 and 2 one embodiment of a package including a plurality of disk-form magnetic recording mediums according to the present invention.

In the drawings, a bottom member 1 and an upper cover member 2 constitute a case for containing a plurality of disk-form magnetic recording mediums 3 which are stacked therein one on another in contact with one another. Each recording medium 3 is provided with a hole 301 in its center. Two spacers 4 and 5 are disposed between the bottom member 1 and the lowermost recording medium 3 and another spacer 6 is arranged between the uppermost recording medium 3 and the cover member 2. Each spacer 4, 5 or 6 is provided with a similar hole to that of the recording medium 3 in its center. The bottom member 1 comprises a flat circular bottom plate or surface 101, a projection ring 102 coaxially disposed around the bottom plate 101, and an upright pillar 103 having a height $H_1$ on the center thereof. An inner diameter $D_1$ of the projection ring 102 is somewhat larger than an outer diameter $d_1$ of the recording medium 3, and an outer diameter $D_2$ of the pillar 103 is somewhat smaller than an inner diameter $d_2$ of the hole 301 of the recording medium 3.

The cover member 2 having an outline of a truncated cone form, has a circular bottom opening 201 and a circular ceiling member 202 having an inner height $H_2$ corresponding to the height $H_1$ of the pillar 103, as shown in FIG. 2. The circular ceiling 202 is provided coaxially with a circular concave portion 203 on its inner center, in which the top of the pillar 103 is fitted. The circular ceiling 202 is also provided with a circular rib portion 204 in its outer edge, which is protruded upwards, for imparting the rigidity sufficient for preventing the periphery of the circular ceiling 202 from deforming when the force is added thereto.

The bottom member 1 is simply coupled with the cover member 2 by fitting the top of the pillar 103 in the concave portion 203 of the cover member 2 and fitting the projection ring 102 of the bottom member 1 in the bottom opening 201 of the cover member 2, thereby assembling a case for containing the recording mediums 3 stacked therein one on another, as shown in FIG. 2.

The bottom member 1, the cover member 2 and the spacers 4, 5 and 6 are made of a thermoplastic or thermosetting synthetic resin material by an extrusion or injection molding. In this case, the injection molding is preferably employed rather than the extrusion molding because of the better even or plane and smooth surface finish. The thermoplastic resins are preferably used rather than the thermosetting resins by reason of the low cost. In particular, a noncrystalline thermoplastic resin such as styrene, polycarbonate, vinyle chloride, and so forth and a crystalline thermoplastic resin such as polyethylene, polypropylene, polyamide, polyethylene terephthalate, and so forth are used.

The disk-form magnetic recording medium 3, as it is well-known, comprises a doughnut disk-form flexible film base made of a plastic resin material such as polyester or the like, and a magnetic paint applied thereto.

As shown in FIG. 2, the outer diameter of the spacer 6 is substantially the same as that of the recording medium 3, but the outer diameters of the spacers 4 and 5 are larger than that of the recording medium 3 but is smaller than the inner diameter of the projection ring 102 of the bottom member 1.

A plurality of longitudinal grooves are formed on the surface of the pillar 103 therealong to form a spline, as shown in FIG. 1, and in fact the diameter of the pillar 103 is somewhat tapered off toward the top, as shown in FIG. 2.

When the disk-form magnetic recording mediums 3 are contained into the case in a stacked state, the spacers 4 and 5 are firstly stacked on the bottom plate 101 of the bottom member 1 by inserting the pillar 103 into their central holes, and then a plurality of diskform magnetic recording mediums 3 are stacked one on another in contact with one another on the spacer 5 by inserting the pillar 103 into their central holes 301. Then the upper spacer 6 is stacked on the top of the recording mediums 3 stacked, and then the cover member 2 is fitted onto the bottom member 1 to obtain a package including the disk-form magnetic recording mediums 3, as shown in FIG. 2. Then, thus the obtained package will be fixed in this state by a proper fixing means.

The maximum number of the recording mediums 3 contained in the case composed of the bottom member 1 and the cover member 2, depends on the height $H_1$ of the pillar 103 or the height $H_2$ of the ceiling 202 of the cover member 2. Usually, 1000-10000 sheets of the recording mediums 3 to be contained are proper, and more preferably 2000-3000 sheets of the recording mediums 3.

In order to prevent a transcription of an unevenness of the spacer's surface onto the disk-form magnetic recording medium 3, it is desirous that at least one contact surface of the spacer 5 or 6 with respect to the recording medium 3 is finished to a sufficiently smooth plane. However, if the inner surfaces of the bottom member 1 and the cover member 2, that is, at least the bottom plate 101 and the circular ceiling 202 are finished to a sufficiently smooth plane, the spacers 4, 5 and 6 may be omitted.

In order to prevent the disassemblage of the package or the case, the outside of the package assembled may be tied fast by a rubber band 120 or other proper binding means.

Figure 3:
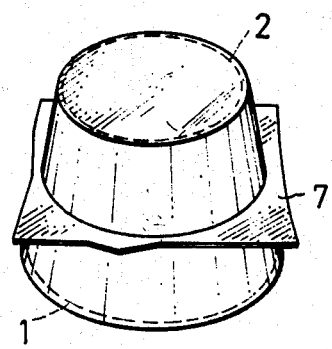
FIG. 3 is a perspective view of the package shown in FIG. 1, which is wrapped by a plastic film by means of a vacuum packing.

Further, the package including the disk-form magnetic recording mediums 3 may be wrapped, by a plastic film 7 by means of a vacuum packing and forms an intermediate shelf, as shown in FIG. 3.

Figure 4:
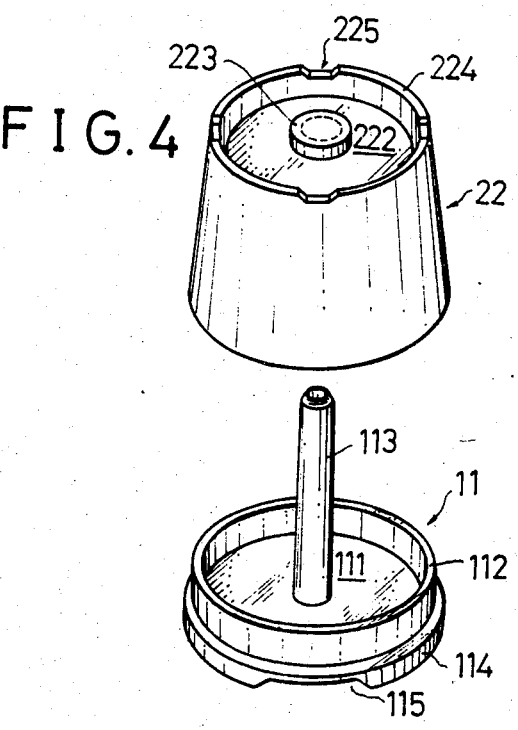
FIG. 4 is an exploded perspective view of another embodiment of a case composed of a bottom member and a cover member according to the present invention.

In FIG. 4, there is shown another embodiment of a case composed of a bottom member 11 and a cover member 22 for containing the recording mediums 3 according to the present invention. This embodiment is constructed for adapting to be binded longitudinally by binding means such as a rubber band.

The bottom member 11 having a similar structure to the one shown in FIG. 1, comprises a flat circular bottom plate, or surface 111, a projection ring 112 and an upright pillar 113 in the same manner as the first embodiment shown in FIG. 1. In this case, a plurality of legs 114 projecting downwards are integrally provided in the periphery of the bottom plate 111 at an equal interval, with the result of a plurality of concave portions 115 between the two legs 114.

The cover member 22 having a similar structure to the one shown in FIG. 1, has a flat circular ceiling member 222 with a circular concave portion 223 in its center in the same manner as the first embodiment shown in FIG. 1. In this case, a tubular ring rib portion 224 projecting upwards is integrally provided at the top periphery of the cover member 22, and the tubular ring rib portion 224 is provided with a plurality of concave cutoff portions 225 in its top, which correspond to the concave portions 115 of the bottom member 11.

In this embodiment, the outer diameter of the tubular ring rib portion 224 of the cover member 22 is smaller than the inner diameter of the legs 114 of the bottom member 11 so that the tubular ring rib portion 224 of the cover member 22 may be exactly fitted in the legs 114 of the bottom member 11, resulting in that the cases composed of the bottom member 11 and the cover member 22 can be securely stacked one on another.

The cover member 22 is placed on the bottom member 11 to assemble the case for containing the recording mediums 3 stacked therein one on another, and then the case is properly tied fast by a rubber band or other binding means which are passed in the concave portions 115 of the bottom member 11 and the concave cutoff portions 225 of the cover member 22 longitudinally.

The cover member is preferably made of a transparent material so as to see the recording mediums 3 contained in the case from the outside.

It is readily understood from the above description that, since a plurality of disk-form magnetic recording mediums 3 are stored in a stacked state in the case composed of the bottom member 1 and the cover member 2, it is possible to carry and store safely a large number of disk-form magnetic recording mediums in the same time and thus it becomes to deal with the recording mediums very easily. Further, since the disk-form magnetic recording mediums are stored in the case separated from the outside, they are protected perfectly from the dust and the moisture and hence they are preserved stably for a long time.

The disk-form magnetic recording medium 3 is flexible because of the polyester film base, and its magnetic surface layer is apt to be damaged by scratching and contacting. Therefore, it is troublesome to deal with the recording mediums carefully without damaging them. According to the present invention, the entire recording mediums stacked one on another are contained in and protected by the case and their magnetic surface layers cannot be damaged during their transit.

Also, since the recording mediums are stacked one on another while the pillar is relatively inserted into the central holes of the recording mediums, the recording mediums can be exactly stacked one on another without causing their slipping off sideways, and, further, no rubbing between the stacked recording mediums is caused by vibrations or the like when carrying them. Accordingly, the damage of the magnetic surface layers of the recording mediums by the rubbing can be exactly prevented and therefore the troubles such as the dropout of the recording medium can be prevented exactly.

Further, since the spacers are disposed in contact with the bottom and the top of the stacked recording mediums, the lowermost and the uppermost recording mediums are protected by the spacers and thus fingerprints to be attached to their surfaces following their dropout can be effectively prevented when dealing with the recording mediums.

If the spacer is used at every other recording medium when the recording mediums are stacked, the maximum number of the recording mediums to be contained is reduced and transcription of the uneven surfaces of the spacers and dropout will be caused. According to the present invention, on the contrary, no spacer is inserted between the adjacent two recording mediums when stacking one on another and such troubles and disadvantages cannot accordingly happen.

Although the present invention has been described with reference to preferred embodiments thereof illustrated in the accompanying drawings, however, various changes and modifications can be made by those skilled in the art without departing from the scope of the present invention.

What is claimed is:

1. An improved package for holding and storing a plurality of disk-form recording mediums, each having a recording area that can be stacked atop one another without spacers therebetween, comprising:
    a bottom member having a flat, circular surface which has an outside diameter greater than the outside diameters of the recording mediums to permit such flat surface to contact the entire recording area of a recording medium, the bottom member further having only one projection ring extending generally perpendicular from the flat surface of the bottom member, the projection ring having an exterior surface of a single, uniform configuration, the inside diameter of the projection ring being greater than the outside diameters of the recording mediums and less than the outside diameter of the bottom member;
    a plurality of spaced apart legs fixed to the bottom member along its peripheral edge, each leg having an angulated side configuration;
    a pillar fixed to the bottom member at its point of center and extending perpendicularly therefrom to a height that is at least equal to the height defined by the recording mediums when stacked;
    a ceiling member having a flat, circular surface that is parallel to the flat surface of the bottom member the flat surface of the ceiling member having an outside diameter that is approximately equal to the outside diameters of the recording mediums and disposed around an interiorly concave portion of the ceiling member which extends about the flat surface of the ceiling member, the interiorly concave portion being configured and dimensioned to receive the pillar;
    a cover member having a surface configured in a truncated cone form, the truncated portion of which is fixed about the ceiling member and includes a plurality of spaced apart cut-off portions, each cut-off portion having an angulated side configuration, the distal portion of the cover member opposite the truncated portion having only a single, uniform interior surface configuration, the interior surface capable of frictionally engaging the exterior surface of the projection ring;
    a plurality of spacers, one of which can interface the flat surface of the bottom member and one recording medium and another of which can interface the flat surface of the ceiling member and one recording medium, each spacer being configured and dimensioned to transmit compression forces from the flat surfaces and equally across to the entire recording areas on the recording mediums;
    binding means for binding the cover member to the bottom member; and
    wrapping means for wrapping the ceiling member, cover member, bottom member, legs, and binding means all within a vacuum sealed environment.

2. The invention of claim 1 wherein the spatial arrangement of the legs defines a plurality of bottom concave portions.

3. The invention of claim 2 wherein the binding means is disposed in the bottom concave portions and the cutoff portions.

4. The invention of claim 3 wherein there are two bottom concave portions and four cut-off portions.

5. The invention of claim 2 wherein the outside diameter of the distal end at the truncated portion is less than the outside diameter of the bottom member.

6. The invention of claim 5 wherein the cover member is made of a translucent material.

7. The invention of claim 2 wherein the pillar is tapered so that the end thereof having the smaller cross-section interfaces the cover member.

8. An improved package for holding and storing a plurality of disk-form magnetic recording mediums having recording areas and stacked atop one another, the package including a cover member, a bottom member, and a pillar about which the recording mediums are disposed, the cover and bottom members being held in engagement by a binding element fixed exteriorly about the cover and bottom members, comprising:
    a bottom member having a smooth, circular, flat surface that can safely interface the recording area of a recording medium in the absence of a spacer therebetween, such flat surface being larger in area than a recording area, the bottom member further having only one projecting ring, the projection ring having a single, uniform exterior surface that extends perpendicularly to the flat surface of the bottom member, the inside diameter of the projection ring being greater than the outside diameters of the recording mediums and less than the outside diameter of the bottom member;
    a pillar fixed to the flat surface of the bottom member and extending perpendicularly therefrom, the pillar having one end tapered;
    a ceiling member having a smooth flat, circular surface that is parallel to the flat surface of the bottom member and can safely interface the recording area of a recording medium in the absence of a spacer therebetween, such flat surface having an area that is approximately equal to a recording area, the flat surface of the ceiling member being disposed around a circular, interiorly concave portion of the ceiling member which extends above the flat surface of the ceiling member, the interiorly concave portion having a flat top side and being configured and dimensioned to receive the tapered end of the pillar;
    a cover member having a surface configured in a truncated cone form, the truncated portion of which is fixed about the ceiling member so that the interiorly concave portion of the ceiling member does not extend beyond the distal end of the truncated portion, the truncated portion includes a rib portion along its distal edge portion, the rib portion defining a plurality of spaced apart cut-off portions, each cut-off portion having an angulated side configuration and a recessed level that is approximately in line with the exterior surface of the ceiling member concave portion, the distal end of the cover member opposite its truncated portion describing only one peripheral edge that has a single, uniform interior surface configuration that can mate with the projection ring, the peripheral edge having an inside diameter greater than the outside diameter of the projection ring;

binding means disposed in the cut-off portions of the cover member and the bottom concave portions for binding the cover member to the bottom member; and wrapping means disposed entirely about the bottom member, legs, ceiling member, and cover member for providing a vacuum sealed environment, the wrapping means having a shelf portion intermediate the bottom member and ceiling member.

9. The invention of claim 8 wherein the bottom member has an outside diameter greater than the outside diameters of either the ceiling member or the projection ring.

10. The invention of claim 9 wherein the legs extend from the bottom member along its circumferential edge.

11. The invention of claim 10 wherein the interior surface of the cover member at the distal end opposite the truncated portion is disposed parallel to the exterior surface of the projection ring.

* * * * *